US010788300B2

(12) United States Patent
Suvorov et al.

(10) Patent No.: US 10,788,300 B2
(45) Date of Patent: Sep. 29, 2020

(54) TAPE MEASURE APPARATUS AND METHOD

(71) Applicants: Nikolay Suvorov, Richmond Hill (CA); Olga Suvorova, Richmond Hill (CA)

(72) Inventors: Nikolay Suvorov, Richmond Hill (CA); Olga Suvorova, Richmond Hill (CA)

(*) Notice: Subject to any disclaimer, the term of this patent is extended or adjusted under 35 U.S.C. 154(b) by 215 days.

(21) Appl. No.: 16/044,929

(22) Filed: Jul. 25, 2018

(65) Prior Publication Data

US 2020/0018586 A1 Jan. 16, 2020

Related U.S. Application Data

(63) Continuation-in-part of application No. 16/032,463, filed on Jul. 11, 2018, now abandoned.

(51) Int. Cl.
*G01B 3/10* (2020.01)
*G01B 3/1003* (2020.01)
*G01B 3/1041* (2020.01)

(52) U.S. Cl.
CPC ......... *G01B 3/1003* (2020.01); *G01B 3/1041* (2013.01)

(58) Field of Classification Search
CPC .................................................. G01B 3/1041
USPC .................................................. 33/760–763
See application file for complete search history.

(56) References Cited

U.S. PATENT DOCUMENTS

| | | | |
|---|---|---|---|
| 4,242,574 A * | 12/1980 | Grant ................. | G01D 5/24404 377/18 |
| 4,574,486 A * | 3/1986 | Drechsler ............ | G01B 3/1041 33/765 |
| 4,827,622 A | 5/1989 | Makar | |
| 4,965,944 A * | 10/1990 | Kuze ......................... | B25H 7/00 33/760 |
| 5,481,810 A * | 1/1996 | Hastings ............... | G01B 3/1071 33/484 |
| 5,606,803 A | 3/1997 | O'Sullivan | |
| 6,158,139 A * | 12/2000 | Bond ................... | G01B 3/1041 33/768 |
| 6,393,710 B1 * | 5/2002 | Hastings ............... | G01B 3/1071 33/484 |
| 6,553,631 B1 * | 4/2003 | Douglas ............... | G01B 3/1041 24/3.12 |
| 6,578,274 B1 * | 6/2003 | Tango, Jr. ................ | B44D 3/38 33/1 G |
| 6,691,425 B1 | 2/2004 | Lee et al. | |
| 6,935,045 B2 | 8/2005 | Cubbedge | |
| 7,716,848 B1 | 5/2010 | Calvey | |
| 7,918,037 B1 | 4/2011 | Polkhovskiy | |
| 8,127,461 B1 | 3/2012 | Peri | |

(Continued)

*Primary Examiner* — George B Bennett
(74) *Attorney, Agent, or Firm* — Argus Intellectual Enterprise; Daniel Enea; Jordan Sworen

(57) ABSTRACT

A tape measure apparatus including a housing having a base-wall, a retractable measuring tape disposed within, and a first-set of indicia markings beginning at a second-end of the base-wall and terminating at a second-tape-end of the retractable measuring tape. The first-set of indicia markings comprise of graduated measurements for measuring a distance between two surfaces or objects. The tape measure apparatus, having the first-set of indicia markings and a lock-mechanism, is useful for enabling a user to accurately measure the distance without bending or distorting the retractable measuring tape and for convenient reading of the measurement result.

15 Claims, 5 Drawing Sheets

(56) References Cited

U.S. PATENT DOCUMENTS

| | | | |
|---|---|---|---|
| 8,590,171 B2 | 11/2013 | Ricalde | |
| 2002/0139002 A1* | 10/2002 | Noon, III | G01B 3/10 |
| | | | 33/760 |
| 2003/0009899 A1 | 1/2003 | Ha | |
| 2004/0172846 A1* | 9/2004 | McRae | G01B 3/1041 |
| | | | 33/760 |
| 2005/0166417 A1 | 8/2005 | Clapper | |
| 2006/0185185 A1 | 8/2006 | Scarborough | |
| 2009/0056159 A1* | 3/2009 | Plucknett | G01B 3/1084 |
| | | | 33/760 |
| 2009/0271999 A1* | 11/2009 | Alker | G01B 3/1084 |
| | | | 33/762 |
| 2010/0139110 A1 | 6/2010 | Germain | |
| 2016/0097624 A1* | 4/2016 | Phillips | G01B 3/566 |
| | | | 33/760 |
| 2016/0245635 A1* | 8/2016 | Cramer | G01B 3/563 |
| 2017/0059294 A1* | 3/2017 | Reese | G01B 3/1041 |

* cited by examiner

TAPE MEASURE APPARATUS AND METHOD

CROSS-REFERENCE TO RELATED APPLICATION(S)

The present application is a Continuation-in-Part application related to and claims priority to Pending U.S. Non-Provisional patent application Ser. No. 16/032,463 filed Jul. 11, 2016, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of measuring tools of existing art and more specifically relates to an improved measuring scale for a tape measure apparatus.

RELATED ART

A tape measure or measuring tape is a flexible ruler used to measure distance. Tape measures are generally coiled around an axis with a spring return mechanism to return the flexible ruler into a housing with the axis. A common problem of tape measures is measuring a distance between two or more surfaces or objects. Often, the flexible ruler is required to be bent to accommodate the surfaces or object in order to measure the full distance. Measurements may become distorted or otherwise difficult to read on the flexible ruler. Therefore, a suitable solution is required.

U.S. Pat. No. 8,590,171 to Paul Ricalde relates to a tape measure apparatus with a rotating and sliding catch. The described tape measure apparatus with a rotating and sliding catch includes an improved tape measure apparatus which includes a catch that is both slidable and rotatable relative to the rule blade in a plane which is perpendicular to the longitudinal axis of the rule blade when the rule blade is extended from the tape casing.

SUMMARY OF THE INVENTION

In view of the foregoing disadvantages inherent in the known measuring tool art, the present disclosure provides a novel tape measure apparatus and method. The general purpose of the present disclosure, which will be described subsequently in greater detail, is to provide a tape measure apparatus and method for improving the measuring of distance between two surfaces.

A tape measure apparatus is disclosed herein. The tape measure apparatus includes a housing including an inner-volume defined by a pair of side-walls, a top-wall, and a base-wall opposite the top-wall. The base-wall may include a first-end, a second-end, and a base-length therebetween.

The tape measure apparatus may further include a tape-hole through the first-end. A retractable measuring tape may be disposed within the inner-volume. The retractable measuring tape includes a first-tape-end, a second-tape-end, and a tape-length therebetween. The retractable measuring tape may be configured to selectively extend from the tape-hole between a coiled-position within the inner-volume and an uncoiled-position outside of the inner-volume. A slideable-tab may be coupled to the first-tape-end via rivets. Further, a lock-mechanism may be utilized to selectively lock the retractable measuring tape in a plurality of uncoiled-positions.

In addition, a first-set of indicia markings may be included beginning at the second-end of the base-wall and terminating at the second-tape-end of the retractable measuring tape. The first-set of indicia markings may comprise of graduated measurements. The first-set of indicia markings may allow a user to accurately measure a distance between two surfaces without bending the retractable measuring tape which can cause measurement readings to become distorted. It should be noted that the first-set of indicia markings continue on the retractable measuring tape at the graduated measurement equal to the base-length.

According to another embodiment, a method of using a tape measure apparatus is also disclosed herein. The method includes providing a tape measure apparatus as described above, placing the second-end of the base-wall at one surface and the first-tape-end of the retractable measuring tape at another surface such that the tape measure apparatus is placed in a measuring position, extending the retractable measuring tape between the coiled-position within the inner-volume and the uncoiled-position outside of the inner-volume, measuring a distance between two surfaces via the first-set of measuring indicia with the first-end of the base-wall being a reading point of measurement result, locking a lock-mechanism on the tape measure apparatus to maintain the retractable measuring tape in the uncoiled position, removing the tape measure apparatus from the measuring position, and reading the reading point of measurement result.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a tape measure apparatus and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a measuring tool and more particularly to a tape measure apparatus and method as used to improve the efficiency of measuring of distance between two surfaces.

Generally, the present invention provides a way to accurately measure the distance between two surfaces (or objects). Ordinary measuring tools (i.e., tape measurers) do not provide an accurate measurement between the surfaces, as it needs to be bended at one end, which results with an inaccurate measurement. The present invention may be useful by providing a specially designed scale for accurate measurements between the surfaces. The scale may start on the measuring tool and terminate on the measuring tape. A lock-mechanism can be utilized with the present invention to provide an easy and accurate way of reading measurements when using the specially designed scale. A regular scale seen on ordinary measuring tools (beginning and terminating on the measuring tape) may be provided for all other measurements.

Referring now more specifically to the drawings by numerals of reference, there is shown in FIGS. 1A-4, various views of a tape measure apparatus 100.

Figure 1A:
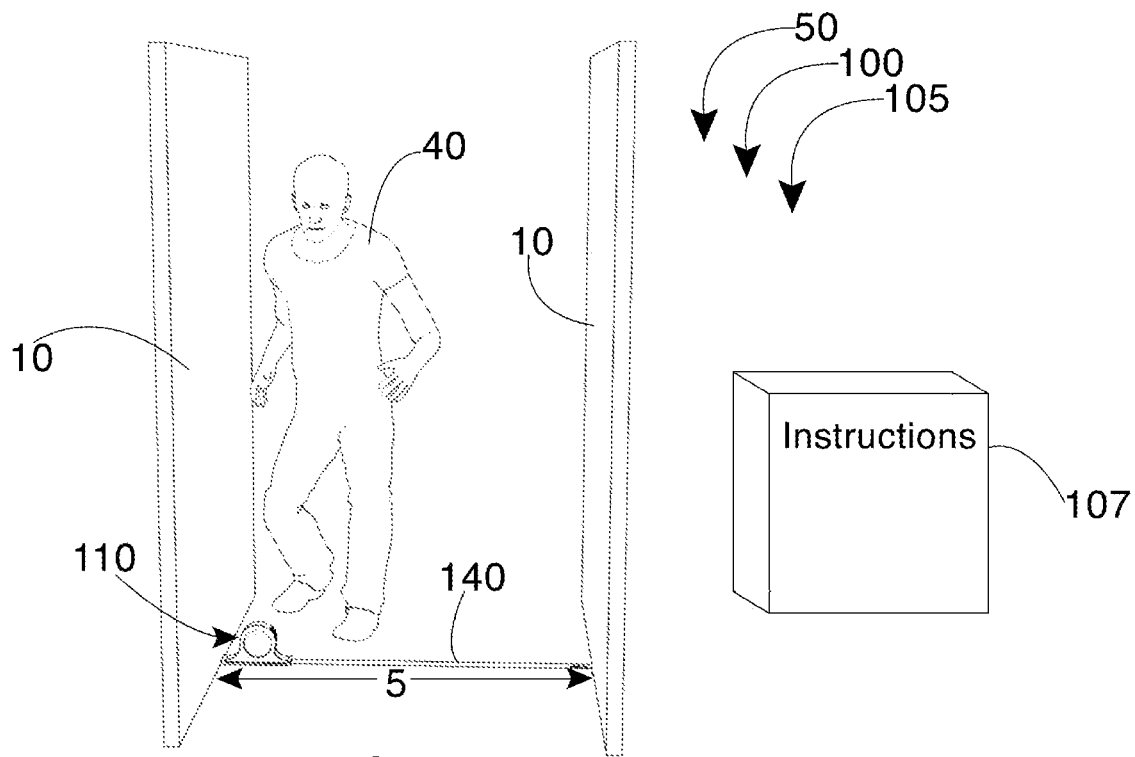
FIG. 1A is a perspective view of the tape measure apparatus during an 'in-use' condition, according to an embodiment of the disclosure.
Figure 1B:
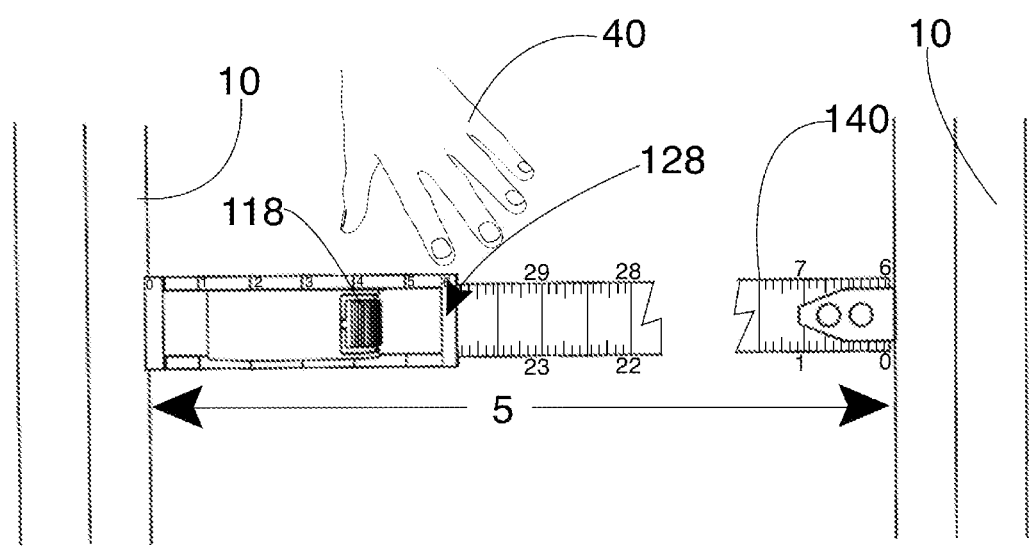
FIG. 1B is a top view of the tape measure apparatus during an 'in-use' condition, according to an embodiment of the disclosure.

FIGS. 1A-1B shows a tape measure apparatus 100 during an 'in-use' condition 50, according to an embodiment of the present disclosure. Here, the tape measure apparatus 100 may be beneficial for use by a user 40 to accurately measure a distance 5 between two surfaces 10 (or objects). As illustrated, the tape measure apparatus 100 may include a housing 110 including an inner-volume 112 defined by a pair of side-walls 114, a top-wall 116, a lock-mechanism 118, and a base-wall 120 opposite the top-wall 116. The base-wall 120 may include a first-end 122, a second-end 124, and a base-length 126 therebetween. A retractable measuring tape 140 may be disposed within the inner-volume 112. The retractable measuring tape 140 includes a first-tape-end 142, a second-tape-end 144, and a tape-length 146 therebetween (FIG. 2).

A first-set of (functional) indicia markings 150 may be provided beginning at the second-end 124 of the base-wall and terminating at the second-tape-end 144 of the retractable measuring tape 140. As shown, the first-set of indicia markings 150 may provide a scale for accurately measuring the distance 5 between the two surfaces 10. The first-end 122 of the base-wall 120 may be a reading point of measurement result 128 when using the first-set of indicia markings 150.

According to one embodiment, the tape measure apparatus 100 may be arranged as a kit 105. In particular, the tape measure apparatus 100 may further include a set of instructions 107. The instructions 107 may detail functional relationships in relation to the structure of the tape measure apparatus 100 such that the tape measure apparatus 100 can be used, maintained, or the like, in a preferred manner.

Figure 2:
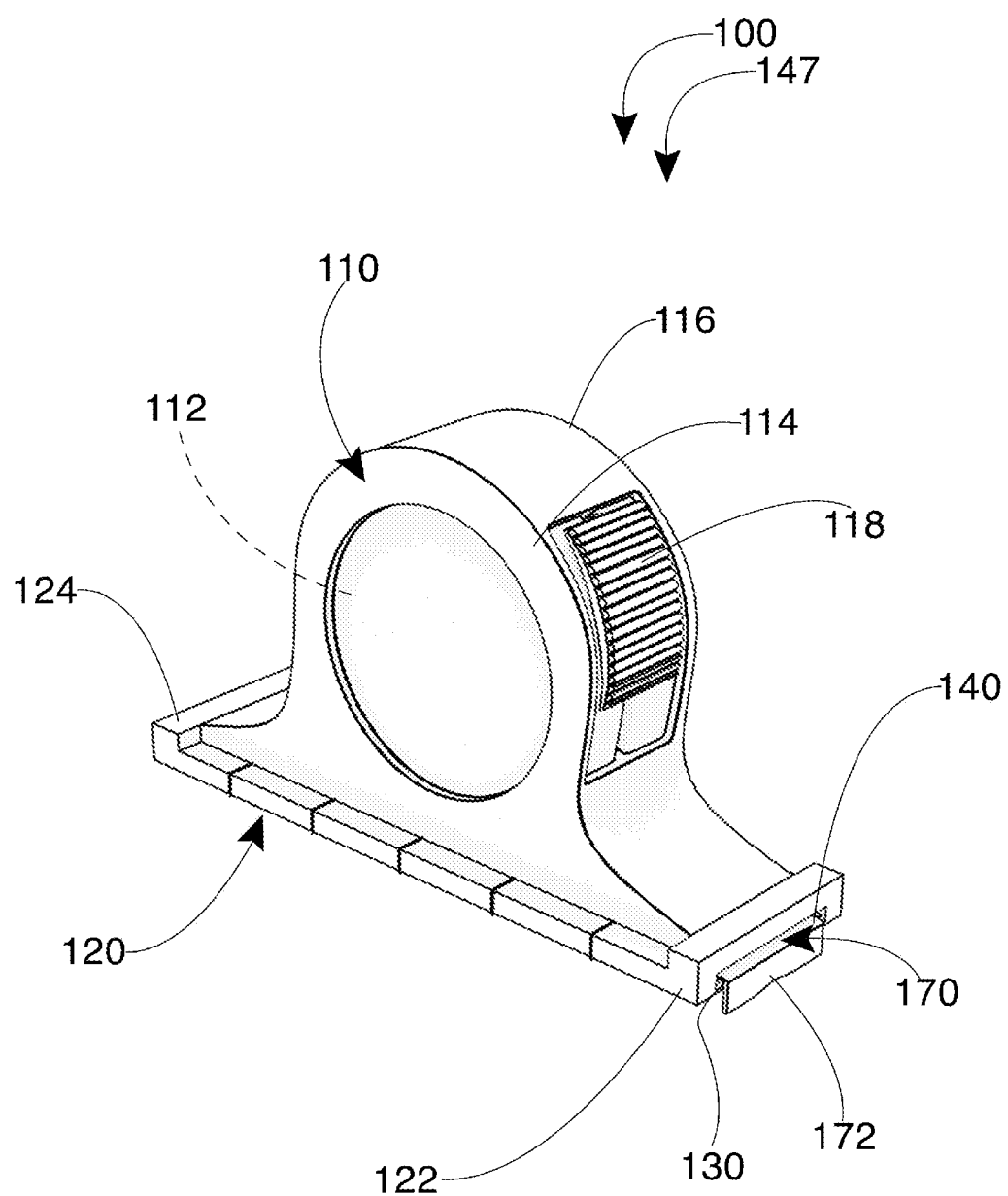
FIG. 2 is a perspective view of the tape measure apparatus of FIG. 1, according to an embodiment of the present disclosure.

FIG. 2 shows the tape measure apparatus 100 of FIG. 1A, according to an embodiment of the present disclosure. As above, the tape measure apparatus 100 may include the housing 110 including the inner-volume 112 defined by the pair of side-walls 114, the top-wall 116, and the base-wall 120 opposite the top-wall 116. The base-wall 120 may include the first-end 122, the second-end 124, and the base-length 126 therebetween. The lock-mechanism 118 may be provided along the top-wall 116 and is configured for selectively locking the retractable measuring tape 140 in a plurality of uncoiled-positions.

The tape measure apparatus 100 may further includes a tape-hole 130 through the first-end 122. The retractable measuring tape 140 may be disposed within the inner-volume 112. The retractable measuring tape 140 includes the first-tape-end 142, the second-tape-end 144, and the tape-length 146 therebetween. The retractable measuring tape 140 may be configured to selectively extend from the tape-hole 130 between a coiled-position 147 within the inner-volume 112 and an uncoiled-position 149 outside of the inner-volume 112. The retractable measuring tape 140 may be sequentially coiled about an axis such that it can be manipulated from the coiled-position 147 and the uncoiled-position 149.

The retractable measuring tape 140 may further include a slideable-tab (i.e. end piece) 170 coupled to the first-tape-end 142. The slideable-tab 170 may include an edge 172 configured for hooking onto the surfaces 10 (or objects) in order to hold the tape measure apparatus 100 in place to achieve a measurement and for adjusting the tape-length 146 according to methods of measuring. The edge 172 may be integral to the slideable-tab 170 at a 90-degree angle in either direction.

Figure 3:
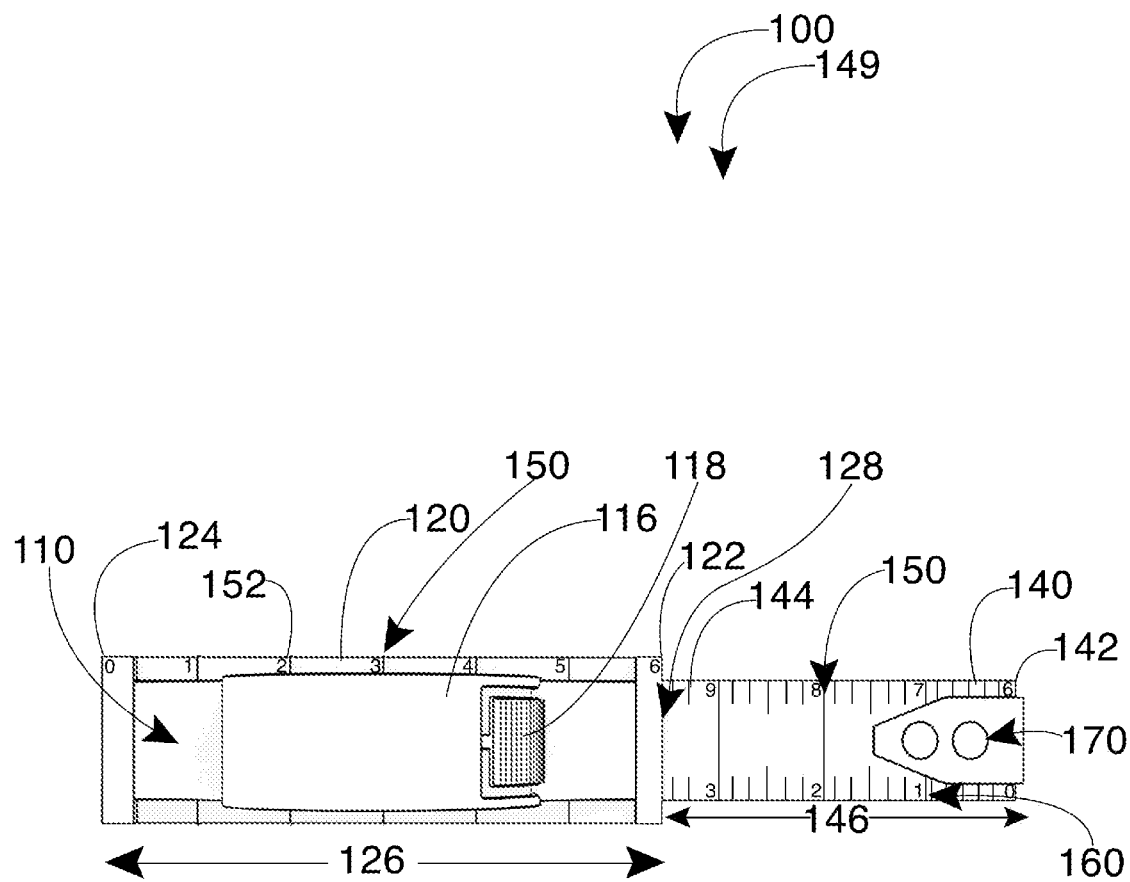
FIG. 3 is a top view of the tape measure apparatus of FIG. 1, according to an embodiment of the present disclosure.

Referring now to FIG. 3, a top view of the tape measure apparatus 100 of FIG. 1A, according to an embodiment of the present disclosure. The tape measure apparatus 100 may include the first-set of (functional) indicia markings 150 for accurately measuring distances 5 between the surfaces 10, and a second-set of (functional) indicia markings 160 for all other measurements. The first-set of indicia markings 150 or the second-set of indicia marking 160 may be utilized with the slideable-tab 170, as described above.

The second-set of indicia markings 160 may begin at the first-tape-end 142 and terminate at the second-tape-end 144 of the retractable measuring tape 140. The second-set of indicia markings 160 may be disposed linearly along the tape-length 146.

The first-set of indicia markings 150 and the second-set of indicia markings 160 may comprise of graduated measurements 152. The graduated measurements 152 may include units of inches and/or centimeters, and fractions thereof. In other embodiments, the graduated measurements 152 may include units of length according to other known systems (i.e., feet). The first-set of indicia markings 150 and the second-set of indicia markings 160 may be disposed on opposite sides of the retractable measuring tape 140.

The first-set of indicia markings 150 may begin at the second-end 124 of the base-wall 120 and terminate at the second-tape-end 144 of the retractable measuring tape 140. The first-set of indicia markings 150 may allow the user 40 to accurately measure the distance 5 between the two surfaces 10 without bending the retractable measuring tape 140 which can cause measurement readings to become distorted. Further, the first-set of indicia markings 150 are configured to accurately measure the distance 5 between two surfaces 10 with the first-end 122 of the base-wall 120 being the reading point of measurement result 128. The first-set of indicia markings 150 may be disposed linearly along the base-length 126 and the tape-length 146, from the second-end 124 to the first-end 122 of the base-wall 120, and from the first-tape-end 142 to the second-tape-end 144. The first-set of indicia markings 150 may continue with the same graduated measurement 152 on the first-end 122 to the first-tape-end 142. As shown in the present embodiment, the first-set of indicia markings 150 may begin with 0" at the second-end 124 of the base-wall 120 and 6" at the first-end 122 of the base-wall 120. The first-set of indicia markings 150 may continue with 6" at the first-tape-end 142.

Figure 4:
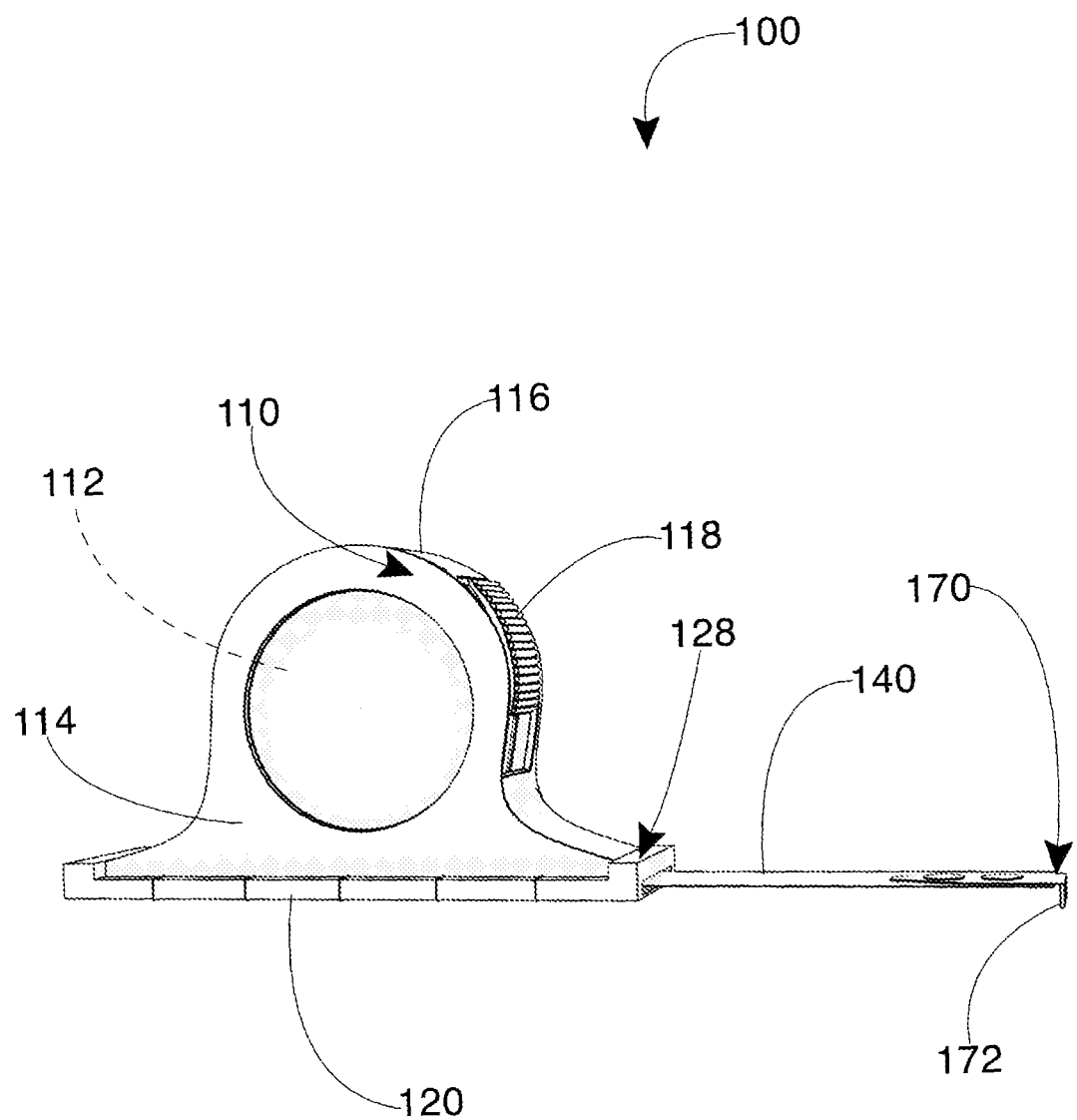
FIG. 4 is a side view of the tape measure apparatus of FIG. 1, according to an embodiment of the present disclosure.

FIG. 4 is a side view of the tape measure apparatus 100 of FIG. 1A, according to an embodiment of the present disclosure. The housing 110 includes the inner-volume 112 defined by the pair of side-walls 114, the top-wall 116, and the base-wall 120 opposite the top-wall 116. The base-wall 120 may include the first-end 122, the second-end 124, and the base-length 126 therebetween. The base-length 126 (FIG. 3) may be larger than a length associated with the pair of side-walls 114 and the top-wall 116 and is configured for a better fit and reading of the reading point of measurement result 128. As shown, the top-wall 116 may extend downwardly towards the base-wall 120 on both ends and taper off. It should be apparent, however, that the housing 110 may take any shape requiring the use of more or less walls with the first-set of measuring indicia 150 being along one wall thereof.

The housing 110 may further include the lock-mechanism 118 configured to selectively lock the retractable measuring tape 140 in the plurality of uncoiled-positions and is configured for easy reading of the reading point of measurement result 128 when using the first-set of indicia markings 150. Preferably, the base-wall 120 is substantially rigid and comprised of rigid material such as metal or hard plastic. The top-wall 116 and the pair of side-walls 114 may be composed of any suitable material.

Figure 5:
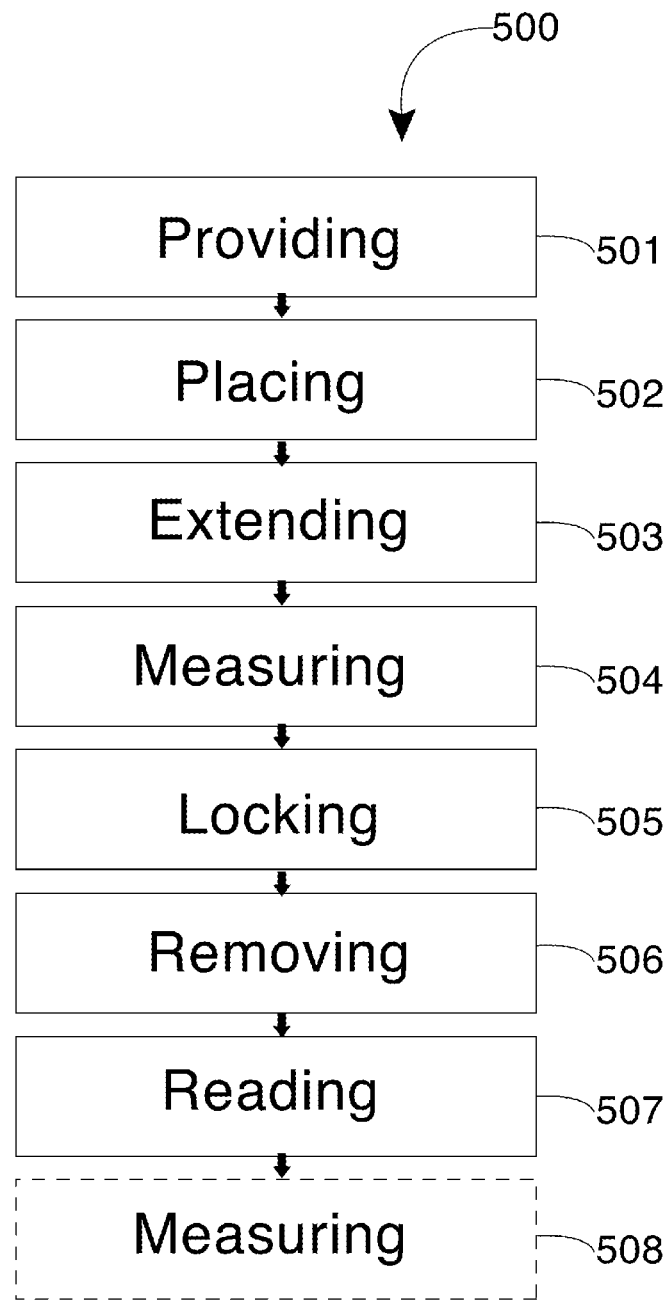
FIG. 5 is a flow diagram illustrating a method of using a tape measure apparatus, according to an embodiment of the present disclosure.

Referring now to FIG. 5 showing a flow diagram illustrating a method for using 500 a tape measure apparatus 100, according to an embodiment of the present disclosure. In particular, the method for using 500 the tape measure apparatus 100 may include one or more components or features of the tape measure apparatus 100 as described above. As illustrated, the method for using 500 the tape measure apparatus 100 may include the steps of: step one 501, providing a tape measure apparatus 100 comprising a housing 110 including an inner-volume 112 defined by a pair of side-walls 114, a top-wall 116, and a base-wall 120 opposite the top-wall 116, the base-wall 120 including a first-end 122, a second-end 124, and a base-length 126 therebetween. The housing 110 further including a tape-hole 130 through the first-end 122 with a retractable measuring tape 140 disposed within the inner-volume 112. The retractable measuring tape 140 includes a first-tape-end 142, a second-tape-end 144, and a tape-length 146 therebetween, and wherein the retractable measuring tape 140 is configured to selectively extend from the tape-hole 130 between a coiled-position 147 within the inner-volume 112 and an uncoiled-position 149 outside of the inner-volume 112. The tape measure apparatus 100 further including a first-set of indicia markings 150 beginning at the second-end 124 of the base-wall 120 and terminating at the second-tape-end 144 of the retractable measuring tape 140; step two 502, placing the second-end 124 of the base-wall 120 at one surface and the first-tape-end 142 of the retractable measuring tape 140 at another surface such that the tape measure apparatus 100 is placed in a measuring position; step three 503, extending the retractable measuring tape 140 between the coiled-position 147 within the inner-volume 112 and the uncoiled-position 149 outside of the inner-volume 112; step four 504, measuring a distance 5 between two surfaces 10 via the first-set of measuring indicia 150 with the first-end 122 of the base-wall 120 being a reading point of measurement result 128; step five 505, locking a lock-mechanism 118 on the tape measure apparatus 100 to maintain the retractable measuring tape 140 in the uncoiled position 149; step six 506, removing the tape measure apparatus from the measuring position to read the measuring results; step seven 507, reading the reading point of measurement result; and step eight 508, measuring the distance 5 via a second-set of measuring indicia 160.

It should be noted that step eight 508 is an optional step and may not be implemented in all cases. Optional steps of method of use 500 are illustrated using dotted lines in FIG. 5 so as to distinguish them from the other steps of method of use 500. Those with ordinary skill in the art will now appreciate that upon reading this specification and by their understanding the art of measuring lengths and distances as described herein, methods of using the tape measure apparatus 100 will be understood by those knowledgeable in such art. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for using the first-set of measuring indicia 150 (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A tape measure apparatus comprising:
   a housing having an inner volume sized to house a retractable measuring tape, the retractable measuring tape including a first tape end, a second tape end, and a tape length therebetween;
   wherein the retractable measuring tape is configured to selectively moveable between a coiled-position within the inner-volume and an uncoiled-position outside of the inner-volume, wherein the retractable measuring tape is adapted to extend from a tape-hole of the housing;
   the housing includes a base wall having a first-end, a second-end, and a base-length portion therebetween;
   a first-set of indicia markings beginning at the second-end of the base-wall and terminating at the second-tape-end of the retractable measuring tape;

wherein the first-set of indicia markings are configured to accurately measure a distance between the second-end of the base-wall and the first tape end at a reading point of measurement result disposed at the first-end of the base wall.

2. The tape measure apparatus of claim 1, wherein the first-set of indicia markings comprises:
   a housing indicia portion and a tape indicia portion;
   the housing indicia portion having a graduated measurement beginning at the second-end of the base wall and terminating at the first end of the base wall;
   the tape indicia portion having a graduated measurement beginning at the first tape end that starts at the graduated measurement terminating at the first end of the base wall such that the tape indicia portion increases from the first tape end toward the second tape end.

3. The tape measure apparatus of claim 2, further comprising a second-set of indicia markings beginning at the first-tape-end and terminating at the second-tape-end of the retractable measure tape.

4. The tape measure apparatus of claim 3, wherein the tape indicia portion of the first-set of indicia markings and the second-set of indicia markings are disposed on opposite sides of the retractable measuring tape.

5. The tape measure apparatus of claim 4, wherein the second-set of indicia markings comprise of graduated measurements.

6. The tape measure apparatus of claim 5, wherein the graduated measurements include units of inches, and fractions thereof.

7. The tape measure apparatus of claim 5, wherein the graduated measurements include units of centimeters, and fractions thereof.

8. The tape measure apparatus of claim 1, wherein the housing further includes a lock-mechanism configured to selectively lock the retractable measuring tape in plurality of uncoiled-positions.

9. The tape measure apparatus of claim 1, wherein the retractable measuring tape includes slideable-tab coupled to the first-tape-end.

10. The tape measure apparatus of claim 9, wherein the slideable-tab includes an edge configured for hooking onto surfaces and for adjusting the tape-length according to methods of measuring.

11. The tape measure apparatus of claim 1, wherein the base-wall is substantially rigid.

12. A method of using a tape measure apparatus, the method comprising:
    providing a tape measure apparatus comprising:
       a housing having an inner volume sized to house a retractable measuring tape, the retractable measuring tape including a first tape end, a second tape end, and a tape length therebetween;
       wherein the retractable measuring tape is configured to selectively moveable between a coiled-position within the inner-volume and an uncoiled-position outside of the inner-volume, wherein the retractable measuring tape is adapted to extend from a tape-hole of the housing;
       the housing includes a base wall having a first-end, a second-end, and a base-length portion therebetween;
       a first-set of indicia markings beginning at the second-end of the base-wall and terminating at the second-tape-end of the retractable measuring tape;
       wherein the first-set of indicia markings are configured to accurately measure a distance between the second-end of the base-wall and the first tape end at a reading point of measurement result disposed at the first-end of the base wall;
    placing the second-end of the base-wall at one surface and the first-tape-end of the retractable measuring tape at another surface such that the tape measure apparatus is placed in a measuring position,
    extending the retractable measuring tape between the coiled-position within the inner-volume and the uncoiled-position outside of the inner-volume,
    measuring a distance between two surfaces via the first-set of measuring indicia with the first-end of the base-wall being a reading point of measurement result,
    locking a lock-mechanism on the tape measure apparatus to maintain the retractable measuring tape in the uncoiled position,
    removing the tape measure apparatus from the measuring position to read the measuring results, and
    reading the reading point of measurement result.

13. The method of claim 12, further comprising measuring the distance via a second-set of measuring indicia.

14. The tape measure apparatus of claim 1, wherein the housing includes an entirely flat base, and a bell-shaped profile for easier measurement and reading of measurement.

15. The tape measure apparatus of claim 14, wherein the housing comprises a single monolithic structure.

* * * * *